(12) United States Patent
Bose et al.

(10) Patent No.: US 12,450,242 B2
(45) Date of Patent: Oct. 21, 2025

(54) RANKING CROSS-DISORDER FEATURES IN MULTIWAY DATA INTERACTIONS

(71) Applicant: International Business Machines Corporation, Armonk, NY (US)

(72) Inventors: Aritra Bose, Astoria, NY (US); Filippo Utro, Pleasantville, NY (US); Myson Burch, West Harrison, NY (US); Laxmi Parida, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 18/616,298

(22) Filed: Mar. 26, 2024

(65) Prior Publication Data

US 2025/0307254 A1 Oct. 2, 2025

(51) Int. Cl.
*G06F 16/20* (2019.01)
*G06F 16/2457* (2019.01)
*G06K 19/06* (2006.01)

(52) U.S. Cl.
CPC . *G06F 16/24578* (2019.01); *G06K 19/06028* (2013.01)

(58) Field of Classification Search
USPC ...................................................... 707/729
See application file for complete search history.

(56) References Cited

U.S. PATENT DOCUMENTS

| 11,244,761 B2 | 2/2022 | Ul Ain et al. |
| 2019/0102513 A1 | 4/2019 | Parida et al. |
| 2019/0304568 A1* | 10/2019 | Wei .......................... G16B 15/20 |
| 2020/0251182 A1 | 8/2020 | Platt et al. |

(Continued)

FOREIGN PATENT DOCUMENTS

| CN | 112786114 A | 5/2021 |
| CN | 114580497 A | 6/2022 |
| WO | 2022121516 A1 | 6/2022 |

OTHER PUBLICATIONS

Aggarwal et al., "Tight Basis Cycle Representatives for Persistent Homology of Large Biological Data Sets", https://journals.plos.org/ploscompbiol/article?id=10.1371/journal.pcbi.1010341, (Retrieved: Nov. 10, 2023), 15 pages.

(Continued)

*Primary Examiner* — Belix M Ortiz Ditren
(74) *Attorney, Agent, or Firm* — Cantor Colburn LLP; Kelsey M. Skodje (57) ABSTRACT

A computer-implemented method includes receiving at a processor an input set of multiway data. The method determines a set of persistent homology barcodes based on the multiway data and identifies at least a first significant persistent homology barcode in the set of persistent homology barcodes. A representative cycle of the first significant persistent homology is returned and an orthonormal basis for a boundary of the multiway data is computed. The method obtains a harmonic representative by computing a projection of the representative cycle to an orthogonal complement and generates a set of feature vectors using the harmonic representative. Each feature vector has a magnitude corresponding to an impact that feature has on a given condition. The method then ranks the feature vectors by feature vector magnitude.

20 Claims, 4 Drawing Sheets

(56) References Cited

U.S. PATENT DOCUMENTS

2020/0335188 A1* 10/2020 Ozeran ............... G06F 40/186
2022/0005548 A1   1/2022 Redei et al.
2023/0018537 A1   1/2023 Brandsma et al.
2023/0162019 A1   5/2023 Parida et al.

OTHER PUBLICATIONS

Basu et al., "Harmonic Persistent Homology (extended abstract)," IEEE 62nd Annual Symposium on Foundations of Computer Science (FOCS), 2021, pp. 1112-1123.
Basu et al., "Sequents, barcodes, and homology," URL: https://arxiv.org/abs/2208.01450; Aug. 2, 2022; 26 pages.
Bose et al., "Ranking Cross-Disorder Features in Multiway Data Interactions", U.S. Appl. No. 18/616,298, filed Mar. 26, 2024.
Gamble et al., "Exploring uses of persistent homology for statistical analysis of landmark-based shape data," Journal of Multivariate Analysis 101, 2010, pp. 2184-2199.
Gurnari et al., "Harmonic Homology for disentangling multiway interactions in data," Theoretical Cheat Sheet, Jul. 2023, 3 pages.
Li et al., "Minimal Cycle Representatives in Persistent Homology Using Linear Programming: An Empirical Study With User's Guide", Frontiers in Artificial Intelligence, 2021, 30 pages.
List of IBM Patents or Patent Applications Treated as Related; Date Filed: Mar. 26, 2024, 2 pages.
Parida et al., "Topological signatures for population admixture." Research in Computational Molecular Biology: 19th Annual International Conference, RECOMB 2015, Apr. 12-15, 2015, Proceedings 19, 17 pages.
Platt et al., "Characterizing redescriptions using persistent homology to isolate genetic pathways contributing to pathogenesis," BMC Systems Biology 2016, 10(Suppl 1):10, pp. 107-119.
Utro et al., "Constructing Predictive Setups Using Harmonic Homology for Disentangling Multiway Interactions", U.S. Appl. No. 18/506,187, filed Nov. 10, 2023.
Utro et al., "Identifying Potential Treatment Paths Using Harmonic Homology for Disentangling Multiway Data Interactions", U.S. Appl. No. 18/506, 194, filed Nov. 10, 2023.
Bose et al., "Contrastive Multi-Omics Association Learning for Complex Diseases", U.S. Appl. No. 18/756,606, filed Jun. 27, 2024.
Zhao et al., "CLCLSA: Cross-omics Linked embedding with Contrastive Learning and Self Attention for multi-omics integration with incomplete multi-omics data," ArXiv (2023): 21 pages.
Elliott et al., "Genome-wide association studies of brain imaging phenotypes in UK Biobank," Nature, 562 (7726), (2018): pp. 210-216.
Elmes et al., "SNVformer: An Attention-based Deep Neural Network for GWAS Data," bioRxiv (2022): 7 pages.
Fülöp et al., "Why we should use topological data analysis in ageing: towards defining the "topological shape of ageing"," Mechanisms of Ageing and Development 192 (2020): 17 pages.
Gurnari et al., "Probing omics data via harmonic persistent homology," arXiv preprint arXiv:2311.06357 (2023): 14 pages.
Hess et al., "MIAAIM: Multi-omics image integration and tissue state mapping using topological data analysis and cobordism learning." bioRxiv (2021): 52 pages.
Jo et al., "Deep learning-based identification of genetic variants: application to Alzheimer's disease classification" Briefings in Bioinformatics 23.2 (2022): pp. 1-11.
Jubair et al., "GPTransformer: A transformer-based deep learning method for predicting Fusarium related traits in barley," Frontiers in plant science 12, 761402 (2021): 14 pages.
Rajadhyaksha et al., "Graph Contrastive Learning for Multi-omics Data." arXiv preprint arXiv:2301.02242 (2023):10 pages.
Rotroff et al., "Embracing Integrative Multiomics Approaches," International journal of genomics, (2016): 6 pages.
Schapiro et al., "histoCAT: analysis of cell phenotypes and interactions in multiplex image cytometry data," Nature methods 14.9 (2017): 14 pages.
Taleb et al., "ContIG: Self-supervised Multimodal Contrastive Learning for Medical Imaging with Genetics" Proceedings of the IEEE/CVF Conference on Computer Vision and Pattern Recognition, (2022): 14 pages.
Xie, Y. et al., "Genetic InfoMax: Exploring Mutual Information Maximization in High-Dimensional Imaging Genetics Studies," arXiv:2309.15132v1 [q-bio.QM], Sep. 26, 2023, pp. 1-17.
Xie, Z. et al., "iGWAS: image-based genome-wide association of self-supervised deep phenotyping of human medical images," medRxiv doi: https://doi.org/10.1101/2022.05.26.22275626, Apr. 7, 2022, pp. 1-36.
Young II, "Disease endotypes of type 1 diabetes: Exploration through machine learning and topological data analysis." Diss. Rutgers The State University of New Jersey, Rutgers School of Health Professions, (2019): 228 pages.

* cited by examiner

RANKING CROSS-DISORDER FEATURES IN MULTIWAY DATA INTERACTIONS

BACKGROUND

The present invention generally relates to ranking cross-data set features for use in a harmonic homology based process.

Multiway interactions in data occur in data sets where any given element is directly affected by multiple distinct and independent factors. One example of a multiway interaction is in the field of medical diagnosis of complex diseases where biomarkers can be shared across multiple diseases or conditions. Any given factor may have a different evidentiary weight across the different comorbid conditions for which the factor may be biomarkers. The complex interplay of features within comorbid conditions can make determining features which are interpretable with significant (i.e., non-negligible) underlying biological or linked phenotypic pathways difficult. This in turn can render utilization of the data in the data set difficult and/or computationally expensive. Complex interplay between the different factors is referred to as multiway interactions in a data set.

Traditionally, identifying the weight, or value, of each factor in multiway interactions in a data set requires the assistance of statistical tools to help measure the effects of single factors across multiple comorbid conditions. The existing tools are computationally expensive, and memory expensive for computing systems.

SUMMARY

Embodiments of the present invention are directed to a computer-implemented method for using harmonic homology to rank feature vectors within multiway data. The multiway data includes a numerical representation of each factor in a set of interconnected factors affecting an outcome and each factor has a codependency on at least one other factor. The method determines a set of persistent homology barcodes based on the multiway data and identifies at least a first significant persistent homology barcode in the set of persistent homology barcodes. The method returns a representative cycle of the first significant persistent homology and computes an orthonormal basis for a boundary of the multiway data. The method obtains a harmonic representative by computing a projection of the representative cycle to an orthogonal complement and generates a set of feature vectors using the harmonic representative, wherein each feature vector has a magnitude corresponding to an impact that feature has on a given condition. The method then ranks the feature vectors by feature vector magnitude and analyzes the given condition using only a subset of the set of feature vectors.

Embodiments of the present invention are also directed to a computer system and a computer program product for implementing the computer implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

A computer-implemented method includes receiving at a processor an input set of multiway data. The multiway data includes a numerical representation of each factor in a set of interconnected factors affecting an outcome and each factor has a codependency on at least one other factor. The method determines a set of persistent homology barcodes based on the multiway data and identifies at least a first significant persistent homology barcode in the set of persistent homology barcodes. The method returns a representative cycle of the first significant persistent homology and computes an orthonormal basis for a boundary of the multiway data. The method obtains a harmonic representative by computing a projection of the representative cycle to an orthogonal complement and generates a set of feature vectors using the harmonic representative, wherein each feature vector has a magnitude corresponding to an impact that feature has on a given condition. The method then ranks the feature vectors by feature vector magnitude and analyzes the given condition using only a subset of the set of feature vectors. The computer-implemented method advantageously allows for selection of features for analysis which are likely to impact an outcome of the analysis, thereby reducing a required computation load.

In another example, the subset of feature factors is a set of most significant feature vectors, further minimizing computational load required to analyze features unlike to impact an output.

In another example, the set of most significant feature vectors is a set of all feature vectors having a magnitude greater than a predefined threshold magnitude, thereby removing any features that are unlikely to impact the output of the analysis.

In another example, the set of most significant feature vectors is a set of N feature vectors having the highest magnitude, where N is a predefined number of feature vectors, thereby limiting the analysis to only the top N features and further limiting the computational load.

In another example, the set of most significant feature vectors is a set of N feature vectors having the highest magnitude greater than a predefined magnitude threshold, thereby removing any features that are unlikely to impact the output of the analysis and further limiting the computational load.

In another example determining the set of persistent homology barcodes includes building a combinatorial structure using the input set of multiway data using the processor, thereby enhancing the factor ranking based on the initial multiway dataset.

In another example the combinatorial structure is one of a Vietoris-Rips structure, an alpha structure, and a Czech complex thereby further improving the ability of the combinatorial structure to provide feature vectors.

In another example, the combinatorial structure forms a simplical complex, thereby representing the correlation between data elements in the data set.

In another example, a processor and a non-transitory computer readable memory store instructions for causing the processor to perform operations of the above described methods, thereby providing a physical structure able to implement the method.

In another example, a non-transitory computer readable storage medium stores instructions for causing a computer system to perform operations of the above described method, thereby providing a means for providing any of the computer-implemented methods to one or more computer systems.

Cross-disorder analysis is significant for complex diseases such as diseases affecting the immune system, circulatory system, psychiatric disorders, neurological disorders, to name a few. Cross-disorder analysis paves the way to understand the shared etiology of biomarkers spanning multiple diseases. Cross-disorder analysis also provides an opportunity to study highly comorbid diseases together.

Cross-disorder studies requires a comprehensive understanding of the patient and their history from multi-modal data sets spanning across electronic medical records (EMRs) and the respective visits to primary care and hospitals with respect to comorbid diseases. Molecular profiling from whole genomic, transcriptome, proteome sequencing to imaging data from many timepoints, often referred multi-omics, are also significant to study in concert. Frequently, however, this type of analysis will include multiple factors that have little, if any, impact (weight) on the condition being reviewed. In such cases the extraneous factors substantially increase the computational resources required to analyze the data without providing a corresponding benefit to being analyzed.

The analysis of complex conditions requires a method which can identify most significant multi-omics features which are relevant across comorbid diseases as well as within them. Finding such features which are also interpretable with underlying biological or phenotypic pathways linked with them would accelerate discovery of therapeutics. Discovering these associations currently is done by clustering or performing cross-disorder genetic analyses, etc. which either finds single genetic associations with the phenotypes of interest or needs supervision along with extensive fine-tuning. Hence, they can be restrictive in many ways. A method of using AI foundation models and topological data analysis (TDA) to obtain ranking of multi-omics features in cross-disorder analyses can beneficially improve current multi-omics based analysis.

Multi-omics feature ranking for cross-disorder analyses can be used to directly compute: A transfer-based multi-omics method to integrate various modalities of healthcare data including EMR, imaging and multi-omics data such as genomics, transcriptomics, proteomics; Interpretable multi-omics associations between and within a set of comorbid diseases; A ranking of multi-omics features associated with multiple related diseases in concert; and to provide a method to learn interpretable ranking of features related with comorbid diseases, indicative of underlying latent biological or clinical pathways from different modalities.

Ranking multi-omics features allows efficient selection of candidates of therapeutics discovery for complex comorbid diseases. Furthermore, alternative implementations or utilizations of the multi-omics feature ranking for cross-disorder analysis may fall within the instant disclosure, and the disclosure is transferable to any correlated data between binary (e.g. Dx, Rx, habits/behavior, demographics), diploid genotypic data, or continuous variables (blood measurements, anthropometric phenotypes, environmental variables, etc.) and imaging phenotypes based on real data. A modality-agnostic associative model, such as the model described herein, allows for wide diversity of data modalities. Even further still, the concepts are transferable to highly comorbid diseases such as diseases of the immune system, psychiatric disorders, etc.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
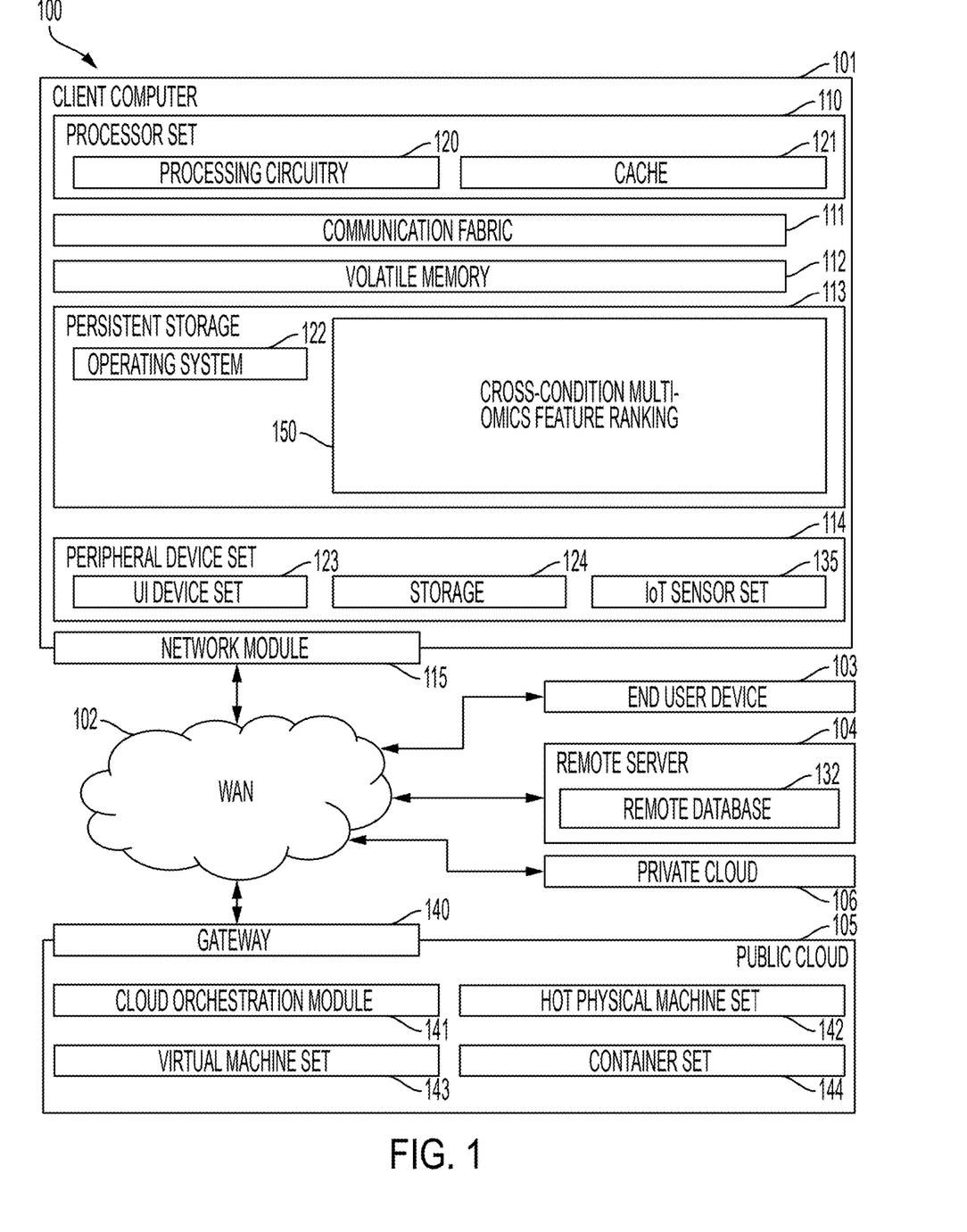
FIG. 1 illustrates a computing environment including an example of an environment for the execution of at least some of the computer code involved in performing the inventive methods and processes.

FIG. 1 illustrates an exemplary computing environment 100 containing an example of an environment for the execution of at least some of the computer code involved in performing the inventive methods, such as "cross-condition multi-omics feature ranking" 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

When attempting to identify potential treatment plans for medical conditions multiway data sets present a problem due to the complex interplay between the factors that impact, or otherwise alter, the effectiveness of a given treatment plan for the medical condition.

Turning now to an overview of the aspects of the invention, one or more embodiments of the invention address the above-described shortcomings of the prior art by utilizing persistent harmonic representatives to narrow down the barcodes. The persistent harmonic representatives allow for feature vectors to be ranked based on the impact the feature has on the analysis. The use of the harmonic representatives allows for a better interpretation of the features space, with the interpretation not being limited to a bar plot of the feature space. This in turn reduces the computational resources and the time required to identify the most impactful feature.

Figure 2:
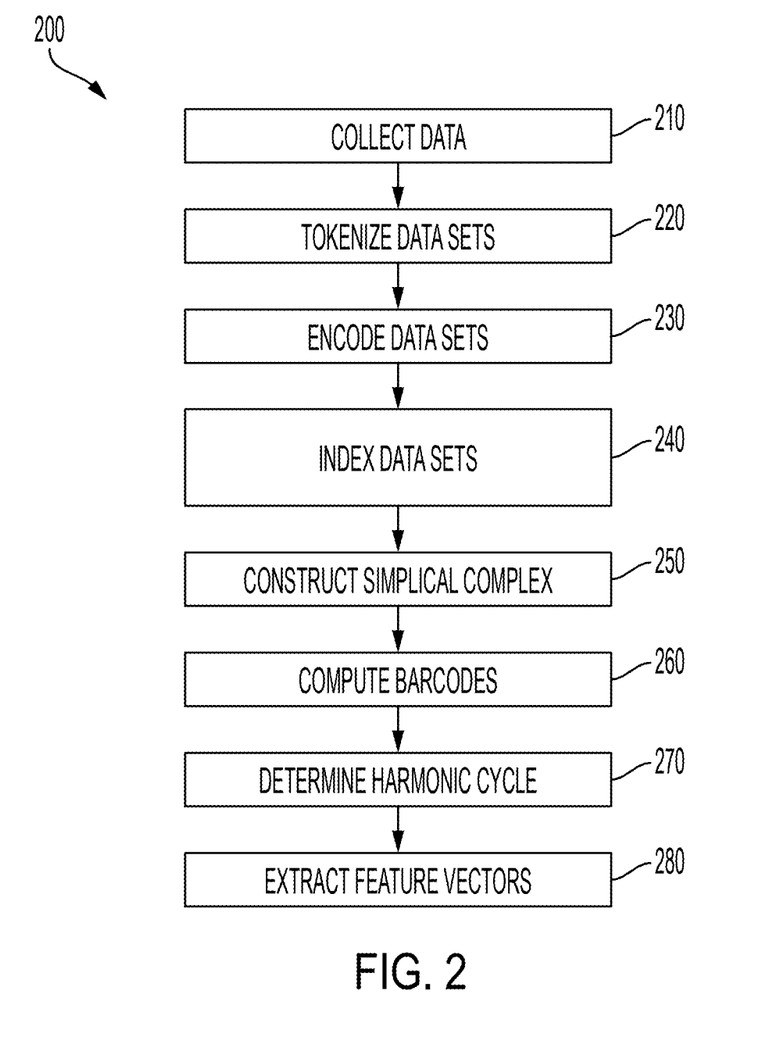
FIG. 2 depicts one exemplary process for identifying the most significant factors from a multiway interaction dataset using harmonic homology.
Figure 3A:
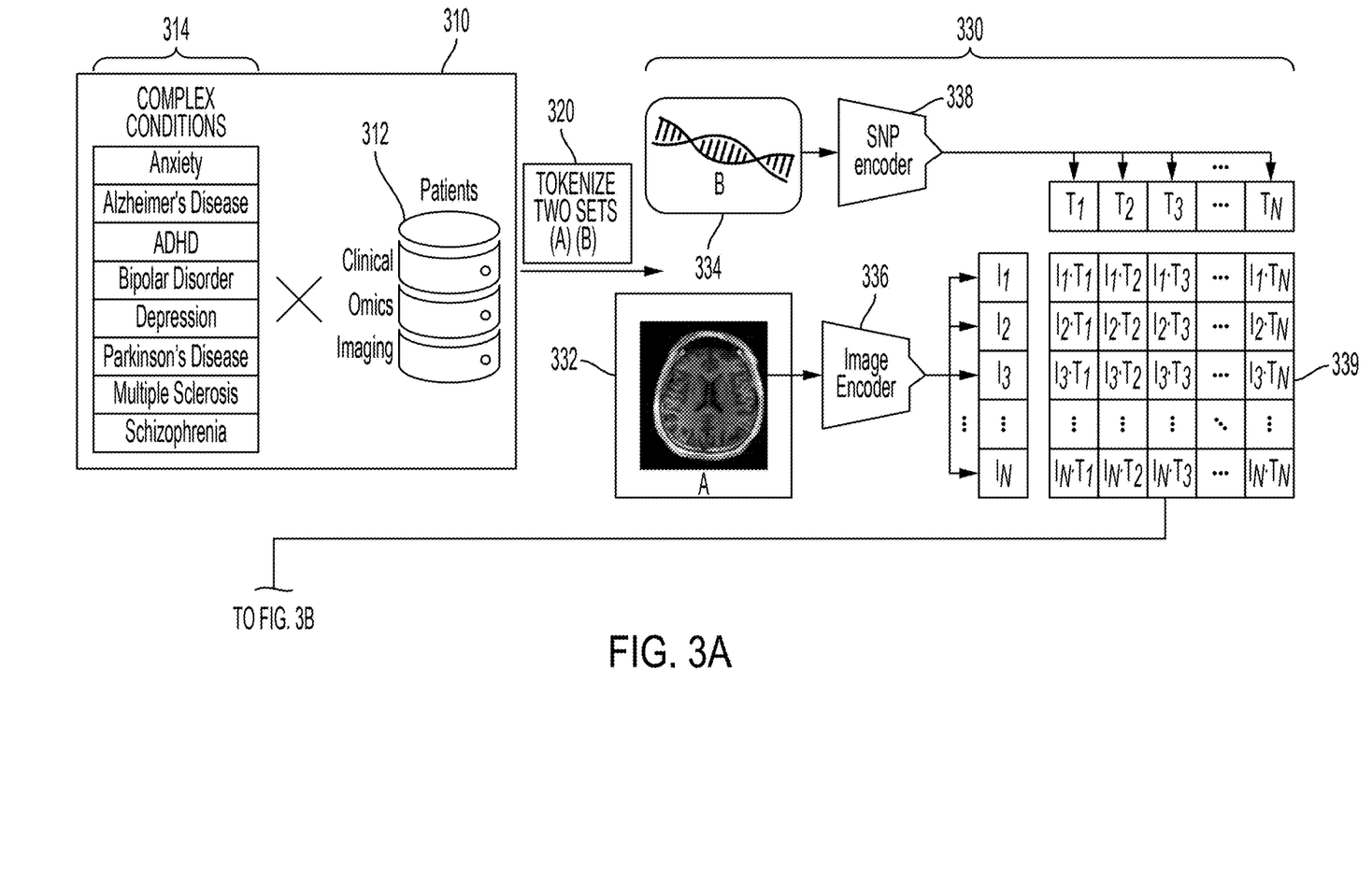
FIGS. 3A and 3B visually depict the process for identifying the most significant factors from a multiway interaction dataset using harmonic homology of FIG. 2.
Figure 3B:
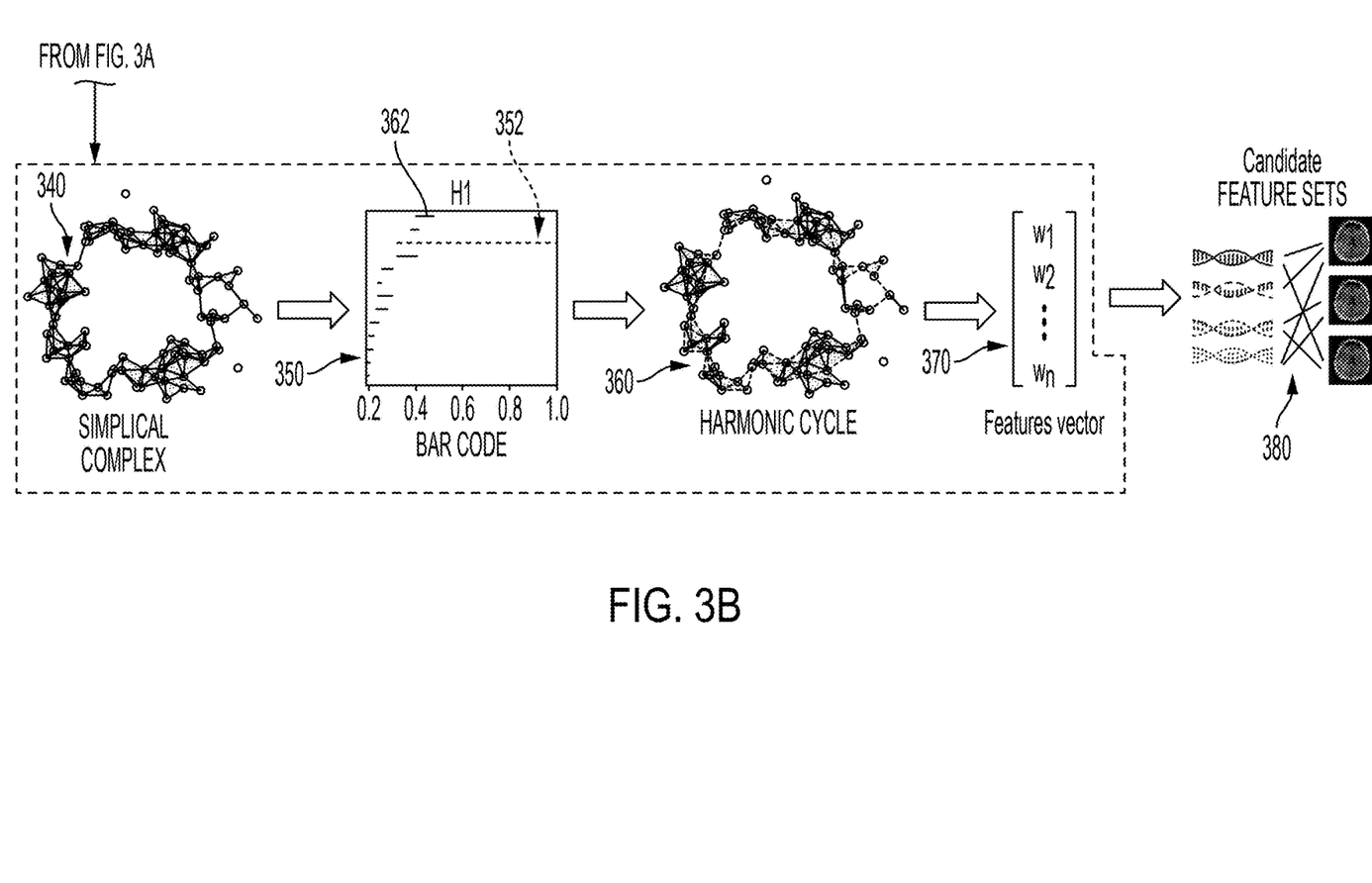

Turning now to a more detailed description of aspects of the present invention, FIG. 2 depicts a generalized process for determining a ranked feature set for a given condition based on a multi-modal binary set of multi-omics data, where the input data is categorical and continuous variables from different modalities. FIG. 3 provides a visual representation of the process of FIG. 2.

While the examples described herein are given with regards to medical and biological conditions (e.g., anxiety, Alzheimer's, ADHD, bipolar disorder, depression, Parkinson's multiple sclerosis, schizophrenia and the like) it is appreciated that the process may be beneficially applied to any system or entity where multiple conditions are comorbid and identification of the most pertinent factors is desirable. Some such entities can include individual humans, with regards to identifying a medical diagnosis, manufacturing systems, with regards to diagnosing an assembly line fault, or any similarly complex system.

Initially the process 200 collects multiple large data sets including distinct data types in a "Collect Data" step 210. By way of example, when the complex condition being diagnosed or analyzed is a medical or biological condition, the data sets 312 can include patient data of three types: clinical, omics, and imaging. In alternative examples, alternative data types may be utilized in a similar manner. The data sets 312 include numerical representations of each factor in a set of interconnected factors affecting a condition 314. Additionally, some or all of the factors have a codependency on at least one other factor in the set of interconnected factors. The interconnected factors for a biological condition can include relevant genetic markers, environmental conditions, comorbidities, and time since onset of condition, severity and the like. Other conditions, such as manufacturing lines and/or other complex conditions may have different factors with similar interrelations.

After collecting the data, two data types are selected from the large data set 312 and tokenized in a "Tokenize Data Sets" step 220. Tokenizing the data pulls each data element of a given data type from the large data set 312 and normalizes the data into two distinct data sets with a one to one correspondence between each tokenized data set 332 (data set A), 334 (data set B).

Once tokenized, each of the tokenized data sets 334, 332 is encoded using a corresponding data encoder 336, 338 in an "Encode Data Sets" step 230. Once encoded, the data sets are indexed with each data element $I_{1-n}$, $T_{1-n}$, cross referenced with each data element in the other data set to from a two dimensional N×N index 339 of the tokenized data sets 332, 334.

The index 339 is used as a set of input mutliway data to construct a combinatorial structure referred to as a simplical complex 340 in a "Construct Simplical Complex" step 250. The multiway data set represents the correlation between each element of the first data set 332 and each aspects of the second data set 334. The combinatorial structure can be built using a Vietoris-Rips complex, an alpha complex, a Čech complex model, or any similar combinatorial structure.

Based on the simplical complex 340, a number of persistent homology barcodes 350 are computed, and the most significant bars 352 of the computed persistent homology barcodes 350 are identified in a "Compute Barcodes" step 260. In some examples, the most significant bar(s) 252 are identified using rules determined via prior information and/ or external system knowledge. In some alternate examples, the set of all computed persistent homology barcodes 350 can be considered, rather than a subset of the most significant bars 352.

In a "Determine Harmonic Cycle" step 270, a representative cycle of each identified significant bar 352 is used to compute an orthonormal basis for the simplical complex 340 at time (b) of the representative cycle. A harmonic representative 360 of the representative cycle is obtained by computing the projection of the representative cycle onto the orthogonal complement of the boundary. Based on the projection, relevant causal factors in the multiway data set are extracted by analyzing the coefficients of the harmonic representative 360 and the casual factors are provided in a set of feature vectors 370 in an "Extract Feature Vectors" step 280. A weight of each feature vector 370 is determined to be the magnitude of each feature vector, and the feature vectors 370 are ordered with the highest weight feature vectors having the highest rank. The weight of each feature vector represents the impact that that feature has on a given condition.

Once ranked, the feature vectors output as important to a given condition can be limited thereby simplifying the analysis and diagnosis without substantially skewing the results. In one example, the top X weighted vectors are utilized. In another example, any feature vectors above a threshold weight are analyzed. In yet other examples, a hybrid of top X and above a threshold limitation may be used where feature vectors are limited to those above the weight threshold, and if more than X feature vectors are still present, the top X feature vectors are utilized as candidate feature sets 380.

In the described application, the process 200 is applied to multi-omics data regarding a set of potential treatment options for a medical condition. The output of the process identifies the top factors relevant to a combination of treatment options that is expected to give an optimal result, while factoring in any comorbidities, and environmental factors that may influence the result.

In one practical implementation the process 200 is applied to (multi-) omics data regarding a given cell lines to identify bio-markers for a drug that may be closer to identified elements. The identified bio-markers are then retained for a drug development test phase, or provided to a patient, allow for a substantially reduction in the number of potentially viable drugs to be tested.

In another practical implementation, the process 200 is applied to a genome-wide assembly study (GWAS) with the process 200 being provided a series of plant GAWAS elements with a desired trait, and the process 200 identifies the most significant factors in the SNP's interplay/importance and a cross plant is generated to maintain these SNPs. An SNP array is a type of DNA microarray which is used to detect polymorphisms within a population.

In yet another practical implementation, the process 200 is provided a series of microbiome data and identifies a microbe's interplay and abundance. The output of the process 200 provides the top relevant factors for determining a best and relative amount of fertilizer, water, light and/or other factors to plan growth in an ideal condition.

Furthermore, the system can be applied to any similar data series while still falling within the disclosed process 200.

The present invention may be a system, a method, and/or a computer program product at any possible technical detail level of integration. The computer program product may include a computer readable storage medium (or media) having computer readable program instructions thereon for causing a processor to carry out aspects of the present invention.

As the modeling cannot practically be done within a human mind, or using a paper and pencil, due to the inherent complexity of multiway data sets, the process 200 is implemented using a computer based statistical modeling system. In such an example, the process is stored on a computer readable storage medium, such as a disk and/or within a computer memory.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving at a processor an input set of multiway data, wherein the multiway data includes a numerical representation of each factor in a set of interconnected factors affecting an outcome, and wherein each factor has a codependency on at least one other factor in the set of interconnected factors;
   determining a set of persistent homology barcodes based on the multiway data using the processer;
   identifying at least a first significant persistent homology barcode in the set of persistent homology barcodes, returning a representative cycle of the first significant persistent homology and computing an orthonormal basis for a boundary of the multiway data;
   obtaining a harmonic representative by computing a projection of the representative cycle to an orthogonal complement;
   generating a set of feature vectors using the harmonic representative, wherein each feature vector has a magnitude corresponding to an impact that feature has on a given condition; and
   ranking the feature vectors by feature vector magnitude and analyzing the given condition using only a subset of the set of feature vectors.

2. The computer implemented method of claim 1, wherein the subset of feature factors is a set of most significant feature vectors.

3. The computer implemented method of claim 2, wherein the set of most significant feature vectors is a set of all feature vectors having a magnitude greater than a predefined threshold magnitude.

4. The computer implemented method of claim 2, wherein the set of most significant feature vectors is a set of N feature vectors having the highest magnitude, where N is a predefined number of feature vectors.

5. The computer implemented method of claim 2, wherein the set of most significant feature vectors is a set of N feature vectors having the highest magnitude greater than a predefined magnitude threshold.

6. The computer implemented method of claim 1, wherein determining the set of persistent homology barcodes includes building a combinatorial structure using the input set of multiway data using the processor.

7. The computer implemented method of claim 6, wherein the combinatorial structure is one of a Vietoris-Rips structure, an alpha structure, and a Czech complex.

8. The computer implemented method of claim 7, wherein the combinatorial structure forms a simplical complex.

9. A computing system comprising:
   a processor and a non-transitory computer readable memory storing instructions for causing the processor to perform operations comprising:
   receiving at the processor an input set of multiway data, wherein the multiway data includes a numerical representation of each factor in a set of interconnected factors affecting an outcome, and wherein each factor has a codependency on at least one other factor in the set of interconnected factors;
determining a set of persistent homology barcodes based on the multiway data using the processer;
identifying at least a first significant persistent homology barcode in the set of persistent homology barcodes, returning a representative cycle of the first significant persistent homology and computing an orthonormal basis for a boundary of the multiway data;
obtaining a harmonic representative by computing a projection of the representative cycle to an orthogonal complement;
generating a set of feature vectors using the harmonic representative, wherein each feature vector has a magnitude corresponding to an impact that feature has on a given condition; and
ranking the feature vectors by feature vector magnitude and analyzing diagnosing the given condition using only a subset of the set of feature vectors.

10. The computing system of claim 9, wherein the subset of feature factors is a set of most significant feature vectors.

11. The computing system of claim 10, wherein the set of most significant feature vectors is a set of all feature vectors having a magnitude greater than a predefined threshold magnitude.

12. The computing system of claim 10, wherein the set of most significant feature vectors is a set of N feature vectors having the highest magnitude, where N is a predefined number of feature vectors.

13. The computing system of claim 10, wherein the set of most significant feature vectors is a set of N feature vectors having the highest magnitude greater than a predefined magnitude threshold.

14. The computing system of claim 9, wherein determining the set of persistent homology barcodes includes building a combinatorial structure using the input set of multiway data using the processor.

15. The computing system of claim 14, wherein the combinatorial structure is one of a Vietoris-Rips structure, an alpha structure, and a Czech complex.

16. The computing system of claim 15, wherein the combinatorial structure forms a simplical complex.

17. A computer program product comprising:
a non-transitory computer readable storage medium storing instructions for causing a computer system to perform operations comprising:
receiving at a processor an input set of multiway data, wherein the multiway data includes a numerical representation of each factor in a set of interconnected factors affecting an outcome, and wherein each factor has a codependency on at least one other factor in the set of interconnected factors, and wherein the interconnected factors include relevant genetic markers, environmental conditions, comorbidities, and/or time since onset of condition, severity;
determining a set of persistent homology barcodes based on the multiway data using the processer;
identifying at least a first significant persistent homology barcode in the set of persistent homology barcodes, returning a representative cycle of the first significant persistent homology and computing an orthonormal basis for a boundary of the multiway data;
obtaining a harmonic representative by computing a projection of the representative cycle to an orthogonal complement;
generating a set of feature vectors using the harmonic representative, wherein each feature vector has a magnitude corresponding to an impact that feature has on a given condition; and
ranking the feature vectors by feature vector magnitude and analyzing diagnosing the given condition using only a subset of the set of feature vectors.

18. The computer program product of claim 17, wherein the subset of feature factors is a set of most significant feature vectors.

19. The computer program product of claim 18, wherein the set of most significant feature vectors is a set of all feature vectors having a magnitude greater than a predefined threshold magnitude.

20. The computer program product of claim 18, wherein the set of most significant feature vectors is a set of N feature vectors having the highest magnitude, where N is a predefined number of feature vectors.

* * * * *